United States Patent
Gan et al.

(10) Patent No.: US 11,221,224 B2
(45) Date of Patent: Jan. 11, 2022

(54) METHOD AND DEVICE FOR GENERATING PATH OF UNMANNED VEHICLE ON CONSTRUCTION SECTION

(71) Applicant: Guangzhou Automobile Group Co., Ltd., Guangdong (CN)

(72) Inventors: Xinhua Gan, Guangdong (CN); Hongshan Zha, Guangdong (CN); Ted S Huang, Guangdong (CN); Wei Xu, Guangdong (CN); Caijing Xiu, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 16/489,365

(22) PCT Filed: Oct. 19, 2018

(86) PCT No.: PCT/CN2018/111087
§ 371 (c)(1),
(2) Date: Aug. 28, 2019

(87) PCT Pub. No.: WO2019/080782
PCT Pub. Date: May 2, 2019

(65) Prior Publication Data
US 2020/0249037 A1    Aug. 6, 2020

(51) Int. Cl.
*G01C 21/34* (2006.01)
*E02F 9/20* (2006.01)
*G05D 1/02* (2020.01)

(52) U.S. Cl.
CPC .......... *G01C 21/3446* (2013.01); *E02F 9/205* (2013.01); *E02F 9/2045* (2013.01);
(Continued)

(58) Field of Classification Search
CPC ........ G01C 21/00; G01C 21/26; G01C 21/34; G01C 21/3446; G01C 21/3453;
(Continued)

(56) References Cited

U.S. PATENT DOCUMENTS

| | | | |
|---|---|---|---|
| 9,056,395 B1 | 6/2015 | Ferguson et al. | |
| 2010/0023251 A1* | 1/2010 | Gale | G09B 29/106 |
| | | | 701/533 |

(Continued)

FOREIGN PATENT DOCUMENTS

| | | |
|---|---|---|
| CN | 104809901 A | 7/2015 |
| CN | 106323309 A | 1/2017 |

(Continued)

*Primary Examiner* — Geepy Pe
*Assistant Examiner* — Michael Allen Brace, Jr.
(74) *Attorney, Agent, or Firm* — Gang Yu

(57) ABSTRACT

Provide are a method and device for generating a path of an unmanned vehicle on a construction section. The method includes: when detecting a construction section, detected obstacle information is acquired; a current accessible area of the construction section is determined according to the type and position information of the obstacle, and each road point included in the current accessible area is determined; a terminal road point of a target driving path is determined according to the current accessible area; a current location of a vehicle is taken as a start road point, path search is performed in the road points included in the current accessible area according to the start road point and the terminal road point, and passing road points of the target driving path in the construction section are determined; and a target driving path is generated according to the start road point, the passing road points and the terminal road point.

17 Claims, 2 Drawing Sheets

(52) U.S. Cl.
CPC ....... *G01C 21/3453* (2013.01); *G05D 1/0238* (2013.01); *G05D 2201/0202* (2013.01)

(58) Field of Classification Search
CPC ... E02F 9/00; E02F 9/20; E02F 9/2025; E02F 9/2045; E02F 9/205; G05D 1/00; G05D 1/02; G05D 1/021; G05D 1/0231; G05D 1/0238; G05D 2201/00; G05D 2201/02; G05D 2201/0202
See application file for complete search history.

(56) References Cited

U.S. PATENT DOCUMENTS

| | | | |
|---|---|---|---|
| 2012/0101727 A1* | 4/2012 | Mays | G09B 29/106 |
| | | | 701/533 |
| 2014/0063232 A1 | 3/2014 | Fairfield et al. | |
| 2017/0176996 A1* | 6/2017 | Ferguson | B60W 30/00 |
| 2017/0242436 A1 | 8/2017 | Creusot | |
| 2017/0300059 A1 | 10/2017 | Rust | |

FOREIGN PATENT DOCUMENTS

| | | |
|---|---|---|
| CN | 107843267 A | 3/2018 |
| WO | 2017029775 A1 | 2/2017 |

* cited by examiner

METHOD AND DEVICE FOR GENERATING PATH OF UNMANNED VEHICLE ON CONSTRUCTION SECTION

TECHNICAL FIELD

The present disclosure relates to the technical field of unmanned driving, and in particular, to a method and device for generating a path of an unmanned vehicle on a construction section, a computer-readable storage medium, and a computer device.

BACKGROUND

Currently, unmanned vehicles generally rely on pre-stored navigation maps in the vehicles to generate driving paths. However, for a construction section with complicated road conditions, a driving path generated based on a navigation map cannot be adapted to real-time road conditions of the construction section, and thus an unmanned vehicle cannot be guided to smoothly pass through the construction section.

SUMMARY

In view of this, it is necessary to provide, for the problem that a driving path generated in a traditional manner cannot be adapted to actual road conditions in a construction section, a method and device for generating a path of an unmanned vehicle of a construction section, a computer-readable storage medium, and a computer device.

According to an embodiment, a method for generating a path of an unmanned vehicle on a construction section is provided. The method includes: when detecting a construction section, detected obstacle information is acquired, wherein the obstacle information includes type and feature information of an obstacle, and the feature information includes position information; a current accessible area of the construction section is determined according to the type and position information of the obstacle, and each road point included in the current accessible area is determined; a terminal road point of a target driving path is determined according to the current accessible area; a current location of a vehicle is taken as a start road point, path search is performed in the road points included in the current accessible area according to the start road point and the terminal road point, and passing road points of the target driving path in the construction section are determined; and a target driving path is generated according to the start road point, the passing road points and the terminal road point.

According to an embodiment, a device for generating a path of an unmanned vehicle on a construction section is provided. The device includes: a feature information acquisition module, configured to acquire, when detecting a construction section, detected obstacle information, the obstacle information including type and feature information of an obstacle, and the feature information including position information; an accessible area determination module, configured to determine a current accessible area of the construction section according to the type and position information of the obstacle, and determine each road point in the current accessible area; a terminal road point determination module, configured to determine a terminal road point of a target driving path according to the current accessible area; a passing road point determination module, configured to take a current location of a vehicle as a start road point, performing path search in the road points in the current accessible area according to the start road point and the terminal road point, and determine passing, road points of the target driving path in the construction section; and a driving path generation module, configured to generate a target driving path according to the start road point, the passing road points and the terminal road point.

According to an embodiment, a computer-readable storage medium is also provided. The computer-readable storage medium has a computer-executable instruction stored thereon, and when the computer-executable instruction is executed by a processor, the processor is enabled to perform the steps of the method for generating a path of an unmanned vehicle on a construction section as mentioned above.

According to an embodiment, a computer device is also provided. The computer device includes a memory and a processor, and the memory storing a computer-readable instruction. When the computer-readable instruction is executed by the processor, the processor is enabled to perform the steps of the method for generating a path of an unmanned vehicle on a construction section as mentioned above.

According to the above method and device for generating a path of an unmanned vehicle on a construction section, the computer-readable storage medium, and the computer device, when a construction section is detected, a current accessible area of the construction section is determined according to type and position information of an obstacle detected in a detection range. It can be seen that an accessible area of a construction section is determined according to detected real-time obstacle information of the construction section, and can be adapted to real-time road conditions of the construction section. Therefore, a driving path generated based on the accessible area can also be adapted to the real-time road conditions of the construction section.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

A method for generating a path of an unmanned vehicle on a construction section provided by the embodiments of the present application can be applied to an unmanned vehicle, where the unmanned vehicle generally relates to an environment sensing system and a control terminal, and the environment sensing system and the control terminal may be connected in a wired or wireless manner for data communication. The control terminal may be an on-board terminal or a mobile terminal, and the mobile terminal may specifically be a mobile phone, a tablet computer or a laptop computer.

Figure 1:
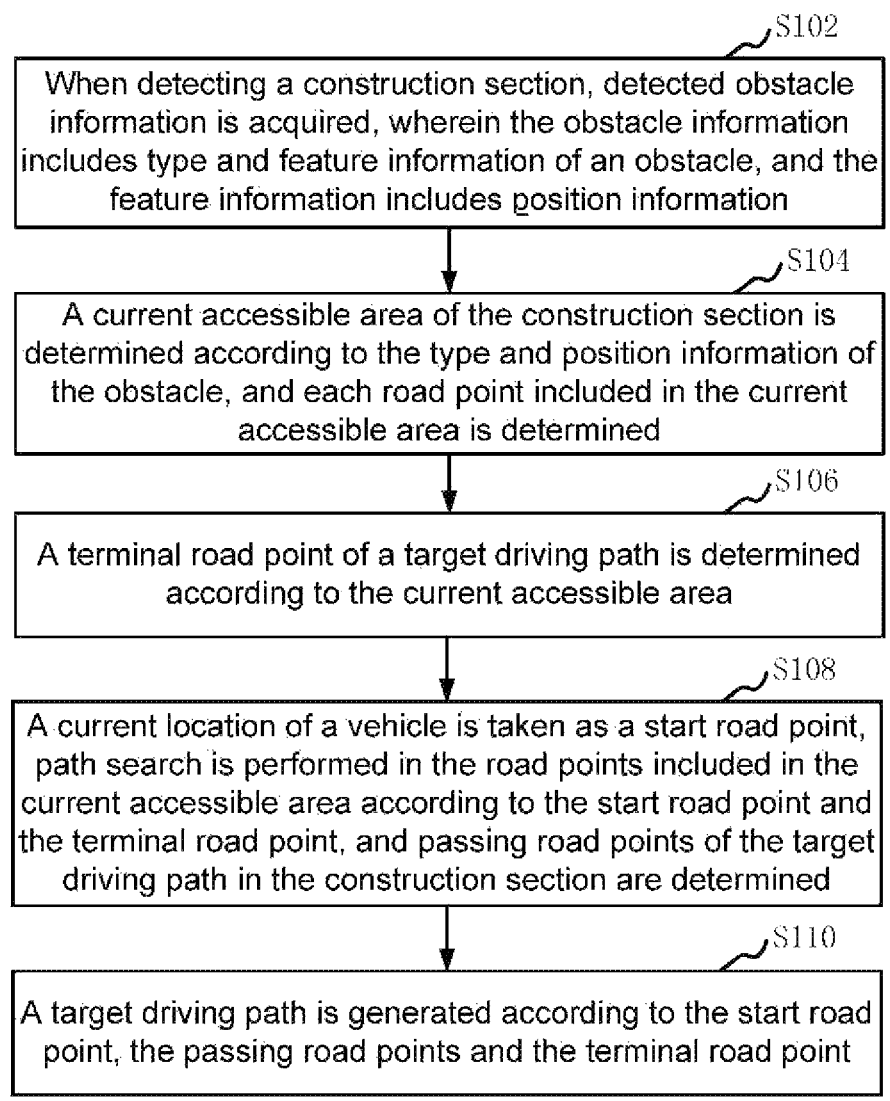
FIG. 1 is a flowchart of a method for generating a path of an unmanned vehicle on a construction section in an embodiment.

FIG. 1 shows a flowchart of a method for generating a path of an unmanned vehicle on a construction section in an embodiment. In the present embodiment, the method is applied to the control terminal described above as an example. Referring to FIG. 1, the method specifically includes step S102 to step S110 as follows.

At step S102, when detecting a construction section, detected obstacle information is acquired, wherein the obstacle information includes type and feature information of an obstacle, and the feature information includes position information.

During the driving of an unmanned vehicle, an environment sensing system on the vehicle may detect a surrounding environment of the vehicle in real time based on a predetermined detection range, and collect environmental information. In a specific example, the environment sensing system may include a laser radar and a camera, and accordingly, the environmental information may include point cloud data acquired by the laser radar and image data acquired by the camera. The point cloud data is generally a set of vectors located in a three-dimensional coordinate system. Vectors in the set are often represented in the form of X, Y, and Z three-dimensional coordinates, and the point cloud data may be used to characterize the shape of a three-dimensional object.

Further, the control terminal may process and analyze the environmental information collected by the environment sensing system, thereby acquiring information such as obstacles, traffic signs, and traffic markings on a road surface within a detection range.

In an embodiment, the control terminal may determine whether there is a construction section in the travel direction of the vehicle based on the environmental information collected by the environment sensing system on the vehicle. In a specific example, when it is recognized that there is a construction mark in the traveling direction of the vehicle through an image obtained by the camera in the environment sensing system, it is determined that there is a construction section in the traveling direction of the vehicle, that is, it is determined that the construction section is detected. The construction mark refers to an object that is often placed near the construction site of a road, such as signs marked with construction information (such as "Road work ahead, please bypass"), traffic protection facilities for construction roads, and construction vehicles (such as excavators and forklifts) in a specified working state.

In addition, when the construction section is detected, obstacle information detected within the detection range is acquired. The detection range may refer to a predetermined detection range of the environment sensing system on the vehicle, the predetermined detection range being related to hardware selection of the environment sensing system. It is to be understood that when there is an obstacle in the construction section within the detection range, the environmental information collected by the environment sensing system may include the information of the obstacle, and then a computer device may be controlled to acquire obstacle information detected within the detection range based on the environmental information. The obstacle information includes type and feature information of the obstacle.

According to one aspect of the present embodiment, the categories of obstacles can be divided into pedestrian obstacles, vehicle obstacles and other obstacles that are neither pedestrians nor vehicles. Specifically, the category of an obstacle may be identified based on image data captured by the camera and deep learning; or sample obstacles may be clustered based on the point cloud data of a large number of sample obstacles obtained by laser radar scanning, and three-dimensional object information is extracted by taking the reflection intensity, lateral and vertical widths and position posture of the sample obstacle as its features, so as to obtain a training set. After an obstacle to be identified is acquired, the obstacle to be identified may be put into the pre-obtained training set, and the category of the obstacle is identified by using an SWM classifier; in addition, the above two identification modes have their own advantages and disadvantages. Preferably, the laser radar can be integrated with the camera, so that respective advantages are fully exerted, thereby identifying the categories of obstacles more accurately.

According to another aspect of the embodiment, the position information of the obstacle can be used to determine the position of the obstacle in the detected construction section. In a specific example, the position information of the obstacle may be represented by a two-dimensional matrix, and more specifically, one fixed coordinate in the two-dimensional matrix may be set as a current location of the vehicle, and the other coordinates are the position of the detected obstacle.

At step S104, current accessible area of the construction section is determined according to the type and position information of the obstacle, and each road point included in the current accessible area is determined.

Generally, for a construction section, some areas are inaccessible to the vehicle, such as an area where construction work is required and an area for stacking construction materials, and an area except the inaccessible area is an area accessible to the vehicle.

In an embodiment, a corresponding position point of the obstacle on the construction section may be obtained according to the position information of the obstacle, and an area where the distance from the position point exceeds a preset distance value is determined as the current accessible area of the construction section. For example, if the preset distance value is 1.2 m and there is only one obstacle to be considered in the detection range, an area covered after expanding to the periphery by 1.2 m from the position point of the obstacle is taken as a current inaccessible area of the construction section. Correspondingly, an area of the construction section except the inaccessible area is a current accessible area of the construction section.

In addition, if there are multiple obstacles to be considered in the detection range, various obstacles correspond to current inaccessible areas one by one. Correspondingly, an area of the construction section except all current inaccessible areas corresponding to the various obstacles is a current accessible area of the construction section.

It is also to be noted that the environment sensing system is generally placed in the center of the roof, so that after obtaining the position information of the obstacle, a current accessible area can be determined together with the width of the vehicle itself. Specifically, a preset distance value is set according to the width of the vehicle itself.

It is to be noted that in map data, road points including longitude and latitude data are generally used to save lane information, and a series of consecutively numbered road points are surveyed on each lane to determine geometric parameters of the lane. Therefore, in an embodiment, each road point included in the current accessible area can be determined based on the pre-stored map data.

At step S106, a terminal road point of a target driving path is determined according to the current accessible area.

The target driving path refers to a driving path to be generated for the detected construction section for guiding the unmanned vehicle to pass through the detected construction section. The terminal road point refers to an end point of the target driving path. In a specific example, a road point satisfying a preset condition may be selected as the terminal road point among the respective road points included in the current accessible area.

At step S108, a current location of a vehicle is taken as a start road point, path search is performed in the road points included in the current accessible area according to the start road point and the terminal road point, and passing road points of the target driving path in the construction section are determined.

In practical applications, when the condition for generating a driving path is satisfied, the current location of the vehicle is determined by a vehicle positioning technology, wherein the vehicle positioning technology may include any one or more of GPS positioning, magnetic navigation positioning, and visual navigation positioning. Thereafter, the current location of the vehicle can be used as the start road point of the target driving path.

The passing road points are road points except the start road point and the terminal road point among all the road points covered by one path. It is to be understood that the way of determining the passing road points is not unique, and it is only necessary to ensure that the passing road points of the target driving path in the detected construction section are located in the accessible area, and the start road point, each passing road point and the terminal road point have corresponding connectivity, and the start road point and the terminal road point can be connected through each passing road point. It can be seen that there are various ways to determine the passing road points, so that for an accessible area, multiple sets of passing road points satisfying the above conditions can be determined among all the included road points.

At step S110, a target driving path is generated according to the start road point, the passing road points and the terminal road point.

The target driving path refers to a path covering all passing road points from the start road point to the terminal road point, which can be used for guiding the unmanned vehicle to pass through the detected construction section.

According to the method for generating a path of an unmanned vehicle on a construction section, when a construction section is detected, a current accessible area of the construction section is determined according to type and position information of an obstacle detected in a detection range. It can be seen that an accessible area of a construction section is determined according to detected real-time obstacle information of the construction section, and can be adapted to real-time road conditions of the construction section. Therefore, a driving path generated based on the accessible area can also be adapted to the real-time road conditions of the construction section.

In order to further explain the solution of the present disclosure in more detail, some preferred embodiments of the present disclosure are specifically described or exemplified below.

In an embodiment, the feature information further includes shape information and size information.

The manner of determining a current accessible area of the construction section according to the type and position information of the obstacle may include: an obstructing area of obstacles of each specified category in the detected construction section is determined according to the position information, shape information and size information of the obstacle of the specified category; a current inaccessible area in the detected construction section is determined based on the obstructing area; and an area except the current inaccessible area of the detected construction section is determined as the current accessible area.

It is to be noted that a variety of obstacles that can affect the actual driving of the vehicle, such as pedestrians, external vehicles, signboards placed in the construction section, and traffic protection facilities, may be detected. However, although some types of obstacles may affect the actual driving of the vehicle, the position of the vehicle itself may be dynamically changed. Therefore, for example, a pedestrian or an external vehicle capable of dynamically moving on the road may be disregarded during the generation of the driving path. Based on this, in the present embodiment, an obstacle that is neither a pedestrian nor a vehicle can be used as an obstacle of a specified category, such as a construction signboard placed on a road, and a traffic protection facility. Further, an obstructing area of obstacles of each specified category in the detected construction section may be only determined according to the position information, shape information and size information of the obstacle of the specified category without the consideration of obstacles except the obstacles of the specified categories.

The obstructing area may be an area, occupied by the obstacle of the specified category on the detected construction section. It is to be understood that if the vehicle body crosses the boundary of an obstructing area of an obstacle of a specified category, the body will collide with the obstacle, so the accessible area should avoid the obstructing area of the obstacle.

Specifically, a contact area of the obstacle of the specified category and the road surface of the construction section may be determined as the obstructing area. Preferably, an area corresponding to a projection of the obstacle of the specified category on the road surface of the construction section may also be determined as the obstructing area of the obstacle. It is to be noted that compared with the foregoing determination of the obstructing area according to the contact area, determination of the obstructing area based on the projection can reduce the probability of the unmanned vehicle colliding with the obstacle of the specified category during the travel process. For example, the construction section has a "T" shaped obstacle of a specified category, a contact area of the obstacle with the construction section is an area defined by the bottom of a "l" shaped portion, and the obstruction of the "-" shaped portion of the obstacle to the unmanned vehicle is obviously not considered, so the vehicle may still collide with the obstacle. However, the area corresponding to the projection of the obstacle on the road surface of the construction section takes, into consideration, the obstruction of an outer edge of the obstacle to the unmanned vehicle, thereby reducing the probability of collision between the unmanned vehicle and an obstacle of a specified category during the travel process.

In an embodiment, the step of determining a current inaccessible area in the detected construction section based on the obstructing area may include: an area obtained by extending an edge of the obstructing area to the periphery by a predetermined distance is determined as a current inaccessible area in the detected construction section.

In the present embodiment, the inaccessible area needs to be able to completely cover the obstructing area, and based on the width of the vehicle itself, a certain distance may be reserved between a boundary line and a boundary line corresponding to the obstructing area, that is, the distance corresponding to the preset distance value.

Specifically, regardless of whether the shape of the obstructing area is regular, the corresponding inaccessible area may be an area, where the shape of the area is the same as that of the obstructing area, the obstructing area can be completely covered, and the distance between the boundary line and the boundary line corresponding to the obstructing area is the preset distance value. A specific example is taken for explanation. An obstructing area is a square with a side length of 0.5 m, and a preset distance value is 1 m. A corresponding inaccessible area is a square where an edge of the square extends to the periphery by 1 m, the square can be completely covered, the side length of four sides is 2.5 m, and the four sides are correspondingly parallel to the four sides of the square.

In an embodiment, the step of determining a terminal road point of a target driving path according to the current accessible area may include the following steps:

when the road cross section of a predetermined condition is searched, a terminal road point of a target driving path is determined according to a lane center line road point covered by the road cross section of the predetermined condition, wherein the road cross section of the predetermined condition is: from the road cross section of the predetermined condition, all lane center line road points of all lanes covered by the detected construction section are located on the road cross section in the current accessible area;

when the road cross section of the predetermined condition is not searched but a road point of the predetermined condition is searched, the terminal road point is determined according to the road point of the predetermined condition, wherein the road point of the predetermined condition is a lane center line road point located in the current accessible area at the farthest end of the detection range; and when the road cross section of the predetermined condition is not searched and the road point of the predetermined condition is not searched, an accessible opening on the road cross section at the farthest end of the detection range is searched, and the terminal road point is determined according to the accessible opening.

In one aspect, the location of the road cross section of a predetermined condition is an end position of the entire construction section, that is, the entire construction section is ended at this position. In the case of searching for the road cross section of the predetermined condition, one of road points may be selected from lane center line road points covered by the road cross section of the predetermined condition as a terminal road point of a target driving path, and may be selected based on the travel direction of the vehicle. For example, the road cross section of the predetermined condition covers three lanes namely a left-turn lane, a straight lane and a right-turn lane. If the vehicle needs to turn right, a lane center line road point of the right-turn lane covered by the road cross section of the predetermined condition is determined as the terminal road point.

In another aspect, if the road cross section of the predetermined condition is not searched within the detection range, it means that the length of the entire construction section may be detected to be long, and the current detection range may cover only a part of the entire construction section. In this case, a terminal road point may be determined according to a lane center line road point (the road point of the predetermined condition) located in a current accessible area at the farthest end of a current detection range. It is to be understood that the position corresponding to the farthest end of the current detection range is the end position of this part of the construction section covered within the current detection range.

In another aspect, if the road point of the predetermined condition is not found, it means that the detected construction section is inaccessible, and an accessible opening such as a U-turn opening is further searched from the road cross section of the farthest end of the detection range. When the accessible opening is found, the terminal road point of the target driving path is determined according to the accessible opening. Specifically, a center point of the found accessible opening may be taken as the terminal road point of the target driving path.

In an embodiment, the step of generating a target driving path according to the start road point, the passing road points and the terminal road point may include the operations as follows.

An initial driving path is generated according to the start road point, the passing, road points and the terminal road point.

The initial driving path is filtered to obtain the target driving path.

It is to be noted that the target driving path may be generated according to the start road point, the passing road points, the terminal road point and the preset path search algorithm, the target driving path generated by the preset search algorithm may be rough, so it may be filtered to smooth the target driving path, thereby improving the accuracy of the target driving path. For example, the target driving path may be generated according to an A-star algorithm. However, an initial driving path obtained by the A-star algorithm is generally not very smooth. After Bezier curve filtering is performed on the initial driving path obtained by the A-star algorithm, a smooth driving path may be obtained.

In an embodiment, a preset path search algorithm includes an A-start algorithm, and a formula for calculating a total cost value of a current road point in the A-start algorithm is:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from a target obstacle closest to the current road point to the current road point: and k is a preset cost constant.

The estimated distance cost may be the Manhattan distance cost, that is, the sum of absolute value of a longitude distance difference and a latitude distance difference between the current road point and the terminal road point, and the Manhattan distance can be used for simple and rapid estimation. In addition, the estimated distance cost may also be a Euclidean distance cost or a diagonal line cost, etc., and is not specifically limited herein.

e(t) is a target obstacle distance cost at a current road point, which considers the distance between an obstacle of a specified category closest to the current road point and the current road point. The larger the distance, the smaller e(t), and a distance threshold may be preset such that e(t) is 0 when the distance is greater than the distance threshold. In a specific example, the distance threshold may be set to 1.8 m based on actual demands. In addition, k is a preset cost constant, which can be calibrated based on the measured effect of the construction section.

In addition, the A-star algorithm is a path search algorithm based on the shortest path principle. Therefore, the present embodiment can obtain a shortest path from the start road point to the terminal road point. Moreover, the present embodiment improves a cost function of the conventional A-star algorithm, and adds the consideration of the distance between a path and an obstacle of a specified category. Therefore, based on the target driving path generated by the present embodiment, the vehicle can maintain an appropriate safety margin with the obstacle of the specified category during the passing process.

It is to be noted that the length of the actual construction section is different. For the construction section with a short length the detection range of the environment sensing system may cover the entire construction section at one time, and correspondingly, the steps of any embodiment provided by the present disclosure are performed once to generate a target driving path, and then the vehicle can be guided to pass through the entire construction section. However, for a construction section with a larger length, the detection range of the environment sensing system cannot cover the entire construction section at one time, and it is necessary to generate a corresponding target driving path for each detection range covering the construction section, and generate multiple target driving paths end to end, so the vehicle can pass through the entire construction section in accordance with the multiple target driving paths. Accordingly, for this case, it is necessary to perform the steps of any of the embodiments provided by the present disclosure multiple times, that is, one target driving path can be generated each time it is performed. The following is a specific example. If a detection range of an environment sensing system disposed on the vehicle is 100 m, that is, it can only cover 100 m at a time, it is necessary to generate a driving path for a construction section with a length of 800 m. The start point of the construction section is A, and the ending point is E. For convenience of explanation, it is assumed that every two points among three intermediate points B, C and D are spaced by 100 m. If the current location of the vehicle is just at point A, a first target driving path from A to B needs to be first generated. When the vehicle travels to B according to the first target driving path, a second target driving path from B to C is generated. When the vehicle travels to C according to the second target driving path, a third target driving path from C to D is generated. When the vehicle travels to D according to the third target driving path, a fourth target driving path from D to E is finally generated. The vehicle sequentially travels according to the four target driving paths to pass through the entire construction section.

Figure 2:
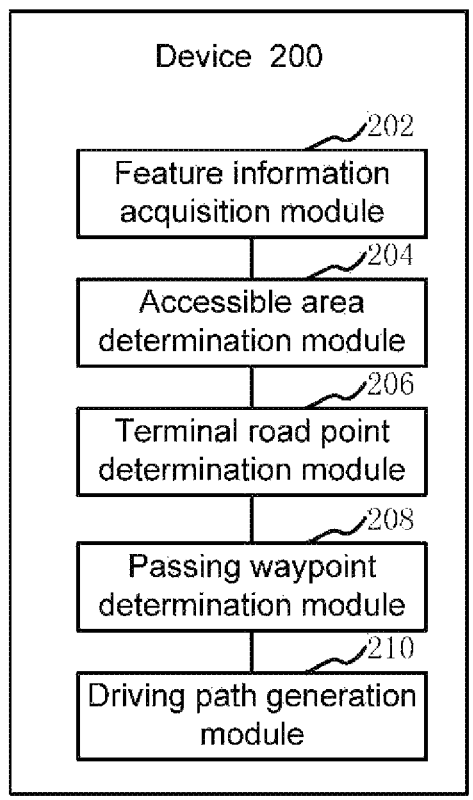
FIG. 2 is a structural schematic diagram of a device for generating a path of an unmanned vehicle on a construction section in an embodiment.

FIG. 2 shows a structural schematic diagram of a device for generating a path of an unmanned vehicle on a construction section in an embodiment. Referring to FIG. 2, the device 200 may specifically include the following modules.

A feature information acquisition module 202 is configured to acquire, when detecting a construction section, detected obstacle information, the obstacle information including type and feature information of an obstacle, and the feature information including position information.

An accessible area determination module 204 is configured to determine a current accessible area of the construction section according to the type and position information of the obstacle, and determine each road point in the current accessible area.

A terminal road point determination module 206 is configured to determine a terminal road point of a target driving path according to the current accessible area.

A passing road point determination module 206 is configured to take a current location of a vehicle as a start road point, performing path search in the road points in the current accessible area according to the start road point and the terminal road point, and determine passing road points of the target driving path in the construction section.

A driving path generation module 210 is configured to generate a target driving path according to the start road point, the passing road points and the terminal road point.

According to the device for generating a path of an unmanned vehicle on a construction section, when a construction section is detected, a current accessible area of the construction section is determined according to type and position information of an obstacle detected in a detection range. It can be seen that an accessible area of a construction section is determined according to detected real-time obstacle information of the construction section, and can be adapted to real-time road conditions of the construction section. Therefore, a driving path generated based on the accessible area can also be adapted to the real-time road conditions of the construction section.

In an embodiment, the feature information further includes shape information and size information.

At this time, the accessible area determination module 204 may include: an obstructing area determination unit, an inaccessible area determination unit and an accessible area determination unit.

The obstructing area determination unit is configured to determine an obstructing area of obstacles of each specified category in the detected construction section according to the position information, shape information and size information of the obstacle of the specified category.

The inaccessible area determination unit is configured to determine a current inaccessible area in the detected construction section based on the obstructing area.

The accessible area determination unit is configured to determine an area except the current inaccessible area of the detected construction section as the current accessible area.

In an embodiment, the inaccessible area determination unit may be specifically configured to: determine an area obtained by extending an edge of the obstructing area to the periphery by a predetermined distance as a current inaccessible area in the detected construction section.

In an embodiment, the terminal road point determination module 206 may include: a first terminal road point determination unit, a second terminal road point determination unit and a third terminal road point determination unit.

The first terminal road point determination unit is configured to determine, when the road cross section of a predetermined condition is searched, a terminal road point of a target driving path according to a lane center line road point covered by the road cross section of the predetermined condition, wherein the road cross section of the predetermined condition is: from the road cross section of the predetermined condition, all lane center line road points of all lanes covered by the detected construction section are located on the road cross section in the current accessible area.

The second terminal road point determination unit is configured to determine, when the road cross section of the predetermined condition is not searched but a road point of the predetermined condition is searched, the terminal road point according to the road point of the predetermined condition, wherein the road point of the predetermined condition is a lane center line road point located in the current accessible area at the farthest end of the detection range.

The third terminal road point determination unit is configured to search for, when the road cross section of the predetermined condition is not searched and the road point of the predetermined condition is not searched, an accessible opening on the road cross section at the farthest end of the detection range, and determine the terminal road point according to the accessible opening.

In an embodiment, the driving path generation module 210 may include: an initial path generation unit and a target path generation unit.

The initial path generation unit is configured to generate an initial driving path according to the start road point, the passing road points and the terminal road point.

The target path generation unit is configured to filter the initial driving path to obtain the target driving path.

In an embodiment, an A-star algorithm is used for path search. In the path search process, a total cost value of a current road point is calculated by the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

Other technical features in the device for generating a path of an unmanned vehicle on a construction section of the present embodiment may be the same as those in the embodiment of the method for generating a path of an unmanned vehicle on a construction section.

Figure 3:
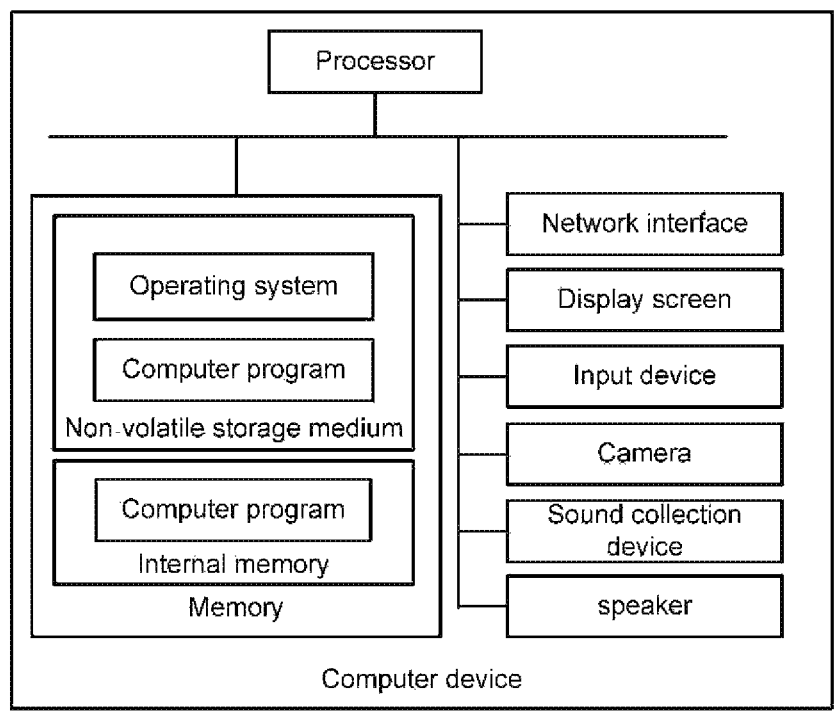
FIG. 3 is a structural block diagram of a computer device in an embodiment.

FIG. 3 shows an internal structure diagram of a computer device in an embodiment. The computer device may specifically be the control terminal mentioned above. As shown in FIG. 3, the computer device may include a processor, a memory, a network interface, an input device and a display screen connected by a system bus. The memory includes a non-volatile storage medium and an internal memory. The non-volatile storage medium of the computer device stores an operating system and may also store a computer program. When the computer program is executed by a processor, the processor is enabled to implement the method for generating a path of an unmanned vehicle on a construction section. The internal memory may further store a computer program. When the computer program is executed by a processor, the processor is enabled to execute the method for generating a path of an unmanned vehicle on a construction section. The display screen of the computer device may be a liquid crystal display screen or an electronic ink display screen, and the input device of the computer device may be a touch layer covered on the display screen, or a button, a trackball or a touchpad provided on a housing of the computer device, or may be an external keyboard, a touchpad or a mouse.

It will be understood by those skilled in the art that the structure shown in FIG. 3 is only a block diagram of a part of the structure related to the solution of the present application, and does not constitute a limitation of the computer device to which the solution of the present application is applied. The specific computer device may include more or fewer components than those shown in the figures, or combine some components, or have different component arrangements.

In an embodiment, the device for generating a path of an unmanned vehicle on a construction section provided by the present disclosure may be implemented in the form of a computer program that may be run on the computer device as shown in FIG. 3. The memory of the computer device may store various program modules forming the device for generating a path of an unmanned vehicle on a construction section such as the feature information acquisition module 202, the accessible area determination module 204, the terminal road point determination module 206, the passing road point determination module 208 and the driving path generation module 210 as shown in FIG. 2. The computer program of each program module causes the processor to perform the steps in the method for generating a path of an unmanned vehicle on a construction section of various embodiments of the present application described in the present specification.

For example, the computer device shown in FIG. 3 may perform step S102 in FIG. 2 via the feature information acquisition module 202 in the device for generating a path of an unmanned vehicle on a construction section as shown in FIG. 2, perform step S104 in FIG. 2 via the accessible area determination module 204, and perform step S106 in FIG. 2 via the terminal road point determination module 206.

For this purpose, a computer device is also provided in an embodiment. The computer device includes a memory and a processor, and the memory storing a computer-readable instruction. When the computer-readable instruction is executed by the processor, the processor is enabled to perform the steps of the method for generating a path of an unmanned vehicle on a construction section in any embodiment provided by the present application.

According to the computer device, when a construction section is detected, a current accessible area of the construction section is determined according to type and position information of an obstacle detected in a detection range. It can be seen that an accessible area of a construction section is determined according to detected real-time obstacle information of the construction section, and can be adapted to real-time road conditions of the construction section. Therefore, a driving path generated based on the accessible area can also be adapted to the real-time road conditions of the construction section.

Those skilled in the art can understand that all or part of the processes in the above method embodiments may be implemented by a computer program to instruct related hardware, and the program may be stored in a nonvolatile computer-readable storage medium. When the program is executed, the flow of each method embodiment as described above may be included. Any reference to a memory, storage, database, or other media used in various embodiments provided by the present application may include nonvolatile and/or volatile memories. The nonvolatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration and not limitation, RAM is available in a variety of formats, such as a Static RAM (SRAM), a Dynamic RAM (DRAM), a Synchronous DRAM (SDRAM), a Dual Data. Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

For this purpose, a computer-readable storage medium is also provided by an embodiment. The computer-readable storage medium has a computer-executable instruction stored thereon. When the computer-executable instruction is executed by a processor, the processor is enabled to perform the steps of the method for generating a path of an unmanned vehicle on a construction section in any embodiment provided by the present application.

According to the computer-readable storage medium, when a construction section is detected, a current accessible area of the construction section is determined according to type and position information of an obstacle detected in a detection range. It can be seen that an accessible area of a construction section is determined according to detected real-time obstacle information of the construction section, and can be adapted to real-time road conditions of the construction section. Therefore, a driving path generated based on the accessible area can also be adapted to the real-time road conditions of the construction section.

The technical features of the above embodiments may be arbitrarily combined. For the sake of brevity of description, all possible combinations of the technical features in the above embodiments are not described. However, as long as there is no contradiction in the combination of these technical features, it is considered to be the range described in this specification.

The above embodiments are merely illustrative of several implementation manners of the present application with specific and detailed description, and are not to be construed as limiting the patent scope of the present application. It is to be noted that a number of variations and modifications may be made by those of ordinary skill in the art without departing from the conception of the present application, and all fall within the scope of protection of the present application. Therefore, the scope of protection of the present application should be determined by the appended claims.

What is claimed is:

1. A method for generating a path of an unmanned vehicle on a construction section, applied to an unmanned vehicle having an environment sensing system and a control terminal, comprising:
    when detecting a construction section, acquiring detected obstacle information, the obstacle information comprising type and feature information of an obstacle, and the feature information comprising position information;
    determining a current accessible area of the construction section according to the type and position information of the obstacle, and determining each road point in the current accessible area;
    determining a terminal road point of a target driving path according to the current accessible area;
    taking a current location of a vehicle as a start road point, performing path search in the road points in the current accessible area according to the start road point and the terminal road point, and determining passing road points of the target driving path in the construction section; and
    generating a target driving path according to the start road point, the passing road points and the terminal road point;
    wherein a step of determining the terminal road point of the target driving path according to the current accessible area comprises:
    when a road cross section of a predetermined condition is searched, determining the terminal road point of the target driving path according to a lane center line road point covered by the road cross section of the predetermined condition, wherein the road cross section of the predetermined condition is: from the road cross section of the predetermined condition, all lane center line road points of all lanes covered by the construction section are located on the road cross section in the current accessible area;
    when the road cross section of the predetermined condition is not searched but a road point of the predetermined condition is searched, determining the terminal road point of the target driving path according to the road point of the predetermined condition, wherein the road point of the predetermined condition is a lane center line road point located in the current accessible area at a farthest end of a detection range; and
    when the road cross section of the predetermined condition is not searched and the road point of the predetermined condition is not searched, searching for an accessible opening on the road cross section at the farthest end of the detection range, and determining the terminal road point of the target driving path according to the accessible opening.

2. The method for generating a path of an unmanned vehicle on a construction section as claimed in claim 1, wherein the feature information further comprises shape information and size information;
    a manner of determining a current accessible area of the construction section according to the type and position information of the obstacle comprises:
    determining an obstructing area of obstacles of each specified category in the construction section according to the position information, the shape information and the size information of the obstacles of the specified categories;
    determining a current inaccessible area in the construction section based on the obstructing area; and
    determining an area except the current inaccessible area of the construction section as the current accessible area.

3. The method for generating a path of an unmanned vehicle on a construction section as claimed in claim 2, wherein a step of determining the current inaccessible area in the construction section based on the obstructing area comprises:
    determining an area obtained by extending an edge of the obstructing area to the periphery by a predetermined distance as the current inaccessible area in the construction section.

4. The method for generating a path of an unmanned vehicle on a construction section as claimed in claim 1, wherein a step of generating the target driving path according to the start road point, the passing road points and the terminal road point comprises:
    generating an initial driving path according to the start road point, the passing road points and the terminal road point; and
    filtering the initial driving path to obtain the target driving path.

5. The method for generating a path of an unmanned vehicle on a construction section as claimed in claim 1, wherein a path search process is performed by using an A-star algorithm, and a total cost value of a current road point is calculated in the path search process by using the following formula:

$$f(t)=g(t)+h(t)+k*e(t)$$

where $f(t)$ is a total cost value of a current road point; $g(t)$ is a cumulative distance cost from the start road point to the current road point; $h(t)$ is an estimated distance cost from the current road point to the terminal road point; $e(t)$ is a distance cost from an obstacle of a specified category closest to the current road point to the current road point; and $k$ is a cost constant.

6. A device for generating a path of an unmanned vehicle on a construction section, comprising:
    a feature information acquisition module, configured to acquire, when detecting a construction section, detected obstacle information, the obstacle information comprising type and feature information of an obstacle, and the feature information comprising position information;

an accessible area determination module, configured to determine a current accessible area of the construction section according to the type and position information of the obstacle, and determine each road point in the current accessible area;

a terminal road point determination module, configured to determine a terminal road point of a target driving path according to the current accessible area;

a passing road point determination module, configured to take a current location of a vehicle as a start road point, performing path search in the road points in the current accessible area according to the start road point and the terminal road point, and determine passing road points of the target driving path in the construction section; and a driving path generation module, configured to generate a target driving path according to the start road point, the passing road points and the terminal road point;

wherein the device is further configured to:

when a road cross section of a predetermined condition is searched, determine the terminal road point of the target driving path according to a lane center line road point covered by the road cross section of the predetermined condition, wherein the road cross section of the predetermined condition is: from the road cross section of the predetermined condition, all lane center line road points of all lanes covered by the construction section are located on the road cross section in the current accessible area;

when the road cross section of the predetermined condition is not searched but a road point of the predetermined condition is searched, determine the terminal road point of the target driving path according to the road point of the predetermined condition, wherein the road point of the predetermined condition is a lane center line road point located in the current accessible area at a farthest end of a detection range; and when the road cross section of the predetermined condition is not searched and the road point of the predetermined condition is not searched, search for an accessible opening on the road cross section at the farthest end of the detection range, and determine the terminal road point of the target driving path according to the accessible opening.

7. The device for generating a path of an unmanned vehicle on a construction section as claimed in claim 6, wherein the feature information further comprises shape information and size information;

the accessible area determination module comprises:

an obstructing area determination unit, configured to determine an obstructing area of obstacles of each specified category in the construction section according to the position information, shape information and size information of the obstacles of the specified categories;

an inaccessible area determination unit, configured to determine a current inaccessible area in the construction section based on the obstructing area; and an accessible area determination unit, configured to determine an area except the current inaccessible area of the construction section as the current accessible area.

8. A computer device, comprising a memory and a processor, the memory storing a computer-readable instruction, wherein when the computer-readable instruction is executed by the processor, the processor is configured to:

when detecting a construction section, acquire detected obstacle information, the obstacle information comprising type and feature information of an obstacle, and the feature information comprising position information;

determine a current accessible area of the construction section according to the type and position information of the obstacle, and determine each road point in the current accessible area;

determine a terminal road point of a target driving path according to the current accessible area;

take a current location of a vehicle as a start road point, performing path search in the road points in the current accessible area according to the start road point and the terminal road point, and determine passing road points of the target driving path in the construction section; and wherein the processor is further configured to:

when a road cross section of a predetermined condition is searched, determine the terminal road point of the target driving path according to a lane center line road point covered by the road cross section of the predetermined condition, wherein the road cross section of the predetermined condition is: from the road cross section of the predetermined condition, all lane center line road points of all lanes covered by the construction section are located on the road cross section in the current accessible area;

when the road cross section of the predetermined condition is not searched but a road point of the predetermined condition is searched, determine the terminal road point of the target driving path according to the road point of the predetermined condition, wherein the road point of the predetermined condition is a lane center line road point located in the current accessible area at a farthest end of a detection range; and when the road cross section of the predetermined condition is not searched and the road point of the predetermined condition is not searched, search for an accessible opening on the road cross section at the farthest end of the detection range, and determine the terminal road point of the target driving path according to the accessible opening.

9. The method for generating a path of an unmanned vehicle on a construction section as claimed in claim 2, wherein a path search process is performed by using an A-star algorithm, and a total cost value of a current road point is calculated in the path search process by using the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

10. The method for generating a path of an unmanned vehicle on a construction section as claimed in claim 3, wherein a path search process is performed by using an A-star algorithm, and a total cost value of a current road point is calculated in the path search process by using the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

11. The method for generating a path of an unmanned vehicle on a construction section as claimed in claim 4, wherein a path search process is performed by using an A-star algorithm, and a total cost value of a current road point is calculated in the path search process by using the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

12. The device for generating a path of an unmanned vehicle on a construction section as claimed in claim 7, the inaccessible area determination unit is further configured to:
determine an area obtained by extending an edge of the obstructing area to the periphery by a predetermined distance as the current inaccessible area in the construction section.

13. The device for generating a path of an unmanned vehicle on a construction section as claimed in claim 6, the terminal road point determination module is further configured to:
when a road cross section of a predetermined condition is searched, determine the terminal road point of the target driving path according to a lane center line road point covered by the road cross section of the predetermined condition, wherein the road cross section of the predetermined condition is: from the road cross section of the predetermined condition, all lane center line road points of all lanes covered by the construction section are located on the road cross section in the current accessible area;
when the road cross section of the predetermined condition is not searched but a road point of the predetermined condition is searched, determine the terminal road point of the target driving path according to the road point of the predetermined condition, wherein the road point of the predetermined condition is a lane center line road point located in the current accessible area at a farthest end of a detection range; and
when the road cross section of the predetermined condition is not searched and the road point of the predetermined condition is not searched, search for an accessible opening on the road cross section at the farthest end of the detection range, and determine the terminal road point of the target driving path according to the accessible opening.

14. The device for generating a path of an unmanned vehicle on a construction section as claimed in claim 6, the driving path generation module is further configured to:
generate an initial driving path according to the start road point, the passing road points and the terminal road point; and filter the initial driving path to obtain the target driving path.

15. The device for generating a path of an unmanned vehicle on a construction section as claimed in claim 6, wherein a path search process is performed by using an A-star algorithm, and a total cost value of a current road point is calculated in the path search process by using the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

16. The device for generating a path of an unmanned vehicle on a construction section as claimed in claim 7, wherein a path search process is performed by using an A-star algorithm, and a total cost value of a current road point is calculated in the path search process by using the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

17. The device for generating a path of an unmanned vehicle on a construction section as claimed in claim 12, wherein a path search process is performed by using an A-star algorithm, and a total cost value of a current road point is calculated in the path search process by using the following formula:

$$f(t)=g(t)+h(t)+k*e(t)$$

where f(t) is a total cost value of a current road point; g(t) is a cumulative distance cost from the start road point to the current road point; h(t) is an estimated distance cost from the current road point to the terminal road point; e(t) is a distance cost from an obstacle of a specified category closest to the current road point to the current road point; and k is a cost constant.

* * * * *